UNITED STATES PATENT OFFICE.

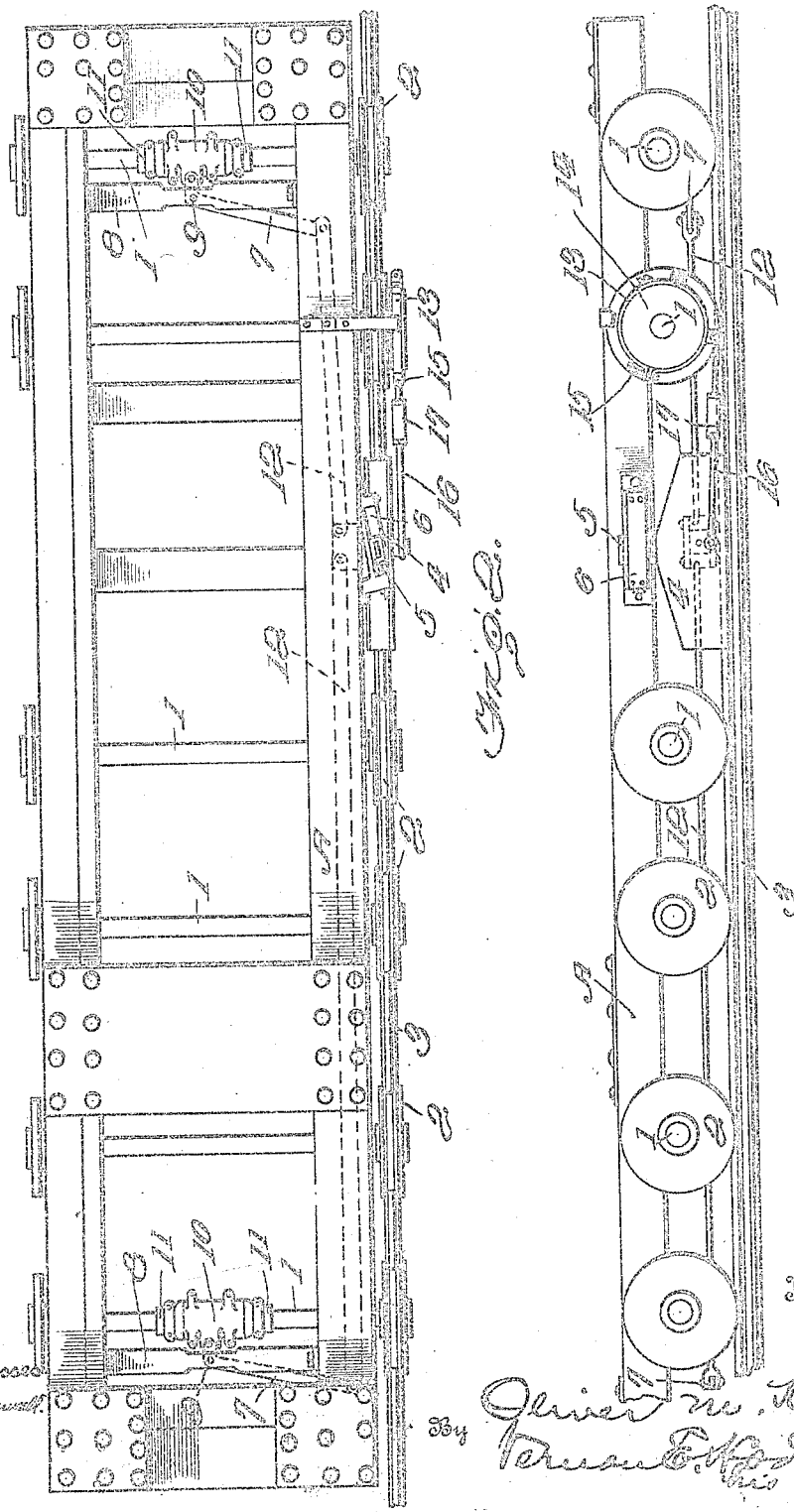

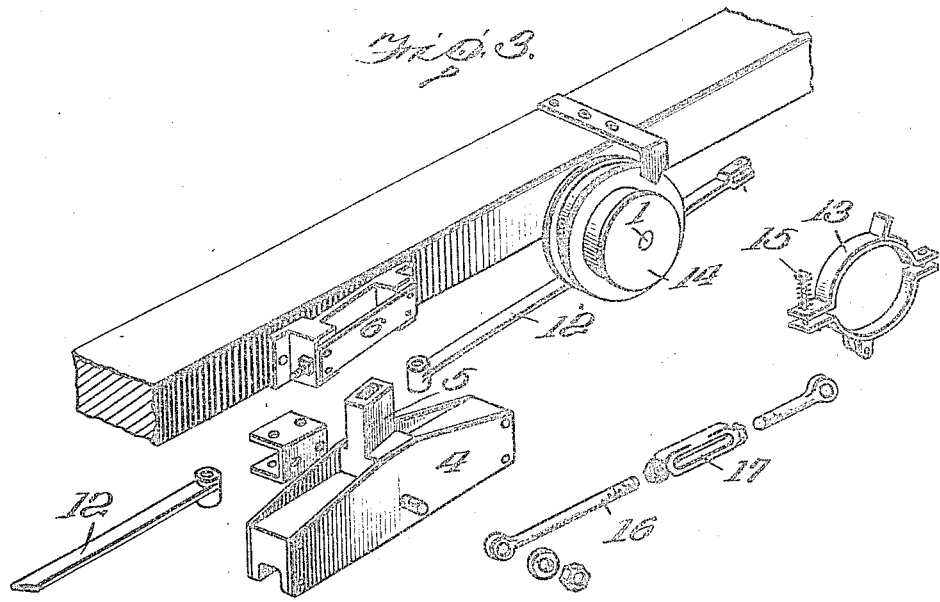
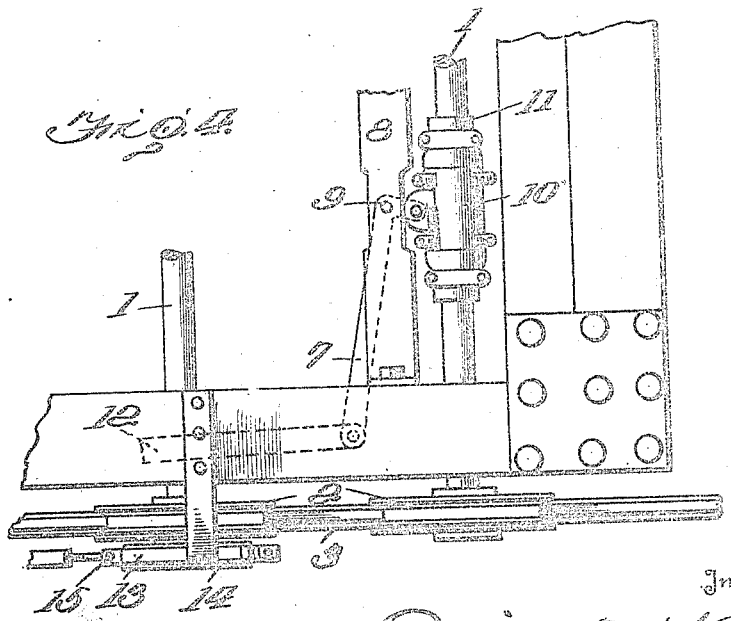

OLIVER M. KREBS, OF MEMPHIS, TENNESSEE, ASSIGNOR TO THE WHELAND COMPANY, OF CHATTANOOGA, TENNESSEE, A CORPORATION OF TENNESSEE.

DRAG-OFFSET FOR SAWMILL-CARRIAGES.

1,248,432.

Specification of Letters Patent.

Patented Nov. 27, 1917.

Application filed May 7, 1917. Serial No. 166,944.

*To all whom it may concern:*

Be it known that OLIVER M. KREBS, a citizen of the United States, residing at Memphis, in the county of Shelby and State of Tennessee, have invented certain new and useful Improvements in Drag-Offsets for Sawmill-Carriages, of which the following is a specification.

My invention relates to an improvement in drag offsets for saw-mill carriages.

As is well understood, the function of a carriage-offset is to cause the saw-mill carriage frame to slide laterally on the axles, so that the log carried by the frame will clear the saw as the carriage returns to the log deck, and then as the carriage moves forward with the cutting of the next board, the offset must first return the carriage frame laterally on its axle up to the saw line, after which the carriage moves down the track past the saw, and the board is sawed off the log.

This is accomplished at present by means of a drag, which rests frictionally upon one of the rails, and with respect to which the carriage-frame has a limited travel before the frictional resistance of the drag upon the rail is overcome by the carriage-frame striking the drag and carrying it along, the effect of which, through the system of levers, is to cause the automatic lateral shifting of the saw-mill carriage frame upon the axles; and, as the carriage reverses—in other words whether moving in one direction or the other—the drag will remain still on the rail until the carriage has traveled along the track as far as the guide which incloses the upper end of the drag will allow, and it is when the drag is stationary, and the carriage is moving, that the offset takes place.

The foregoing is old and common practice.

A defect in the present system as above outlined, is that if the carriage is traveling in either direction at a fair speed, if the sawyer or one who operates the carriage, suddenly stops the carriage, the tendency of the drag is to continue to travel on, due to its momentum, thereby causing the carriage to automatically offset laterally at the wrong time.

The object of my present invention is to effectually overcome this tendency; and it consists in a band friction applied to one of the axles, and connected with the drag, thereby preventing or overcoming this momentum of the drag in the event of a sudden stop of the carriage.

In the accompanying drawings:—

Figure 1 is a plan view;

Fig. 2 is a side elevation;

Fig. 3 is a view in perspective of the parts dismembered; and

Fig. 4 is an enlarged sectional detail.

A, is the carriage-frame; 1, 1, are the axles; 2, 2, indicate the grooved wheels on the track 3; 4 indicates the drag which by gravity rests upon the rail 3, as clearly illustrated in Fig. 2 with which it is in frictional engagement. The upper end 5 of the drag is confined slidingly in the guide 6 secured to the side of the carriage-frame, and which is preferably inclined as shown in Fig. 1, to allow for the lateral movement of the frame in the automatic shifting with respect thereto.

The levers 7, 7, are pivoted to the cross-bars 8 on the carriage-frame, as shown at 9, and are also pivotally connected with the sleeves 10 confined between collars 11, 11, on the end axles; and connecting-bars 12, 12, extend from the long arms of the levers 7 to the drag 4.

A friction 13, constructed in any convenient manner, but conveniently as illustrated in Fig. 3, embraces a drum 14 secured on one of the axles 1. A tension-device 15 is provided, by adjusting which the band friction is tightened, and it is possible to make the offset of the frame more positive, as it very materially assists the drag to do its work.

A connecting-rod 16 extends from the band friction to the drag 4, and this may be lengthened or shortened through any convenient means, such as a turn-buckle 17 to regulate the adjustment as to length.

From the foregoing construction it will be understood that, by means of the band friction, any tendency of the drag to continue on, after a sudden stop of the saw-mill carriage, which might otherwise—and frequently has—occurred until the end 5 reached the opposite end of the guide 6, is effectually resisted by the frictional contact of the band 13 upon the drum 14, thus absolutely preventing a premature lateral shifting or offset of the saw-mill carriage, which is the purpose of my present invention.

While I have described a way of doing this, it is obvious that other schemes might be devised to accomplish the same thing, the gist of my invention being to cause the drag to stop when the carriage stops, or with the carriage, instead of continuing on by momentum at a time when the effect would be to cause a lateral shifting or offsetting of the saw-mill carriage at an inopportune time in the sawing operation.

The offsetting cannot take place until the axle reverses. As soon as the carriage starts back, the offset begins, which cannot take place before the carriage starts to reverse.

I claim:

1. The combination with a laterally-shiftable saw-mill carriage-frame and a drag adapted to frictionally engage a rail on which the carriage travels, and in connection with which the carriage-frame has a certain amount of independent movement, and means connected with the saw-mill carriage frame and drag for causing the automatic lateral shift of the carriage as the frame moves independently of the drag, of means connected with the drag for preventing the drag from moving on by momentum, independently of the carriage frame, when the latter is suddenly stopped.

2. The combination with a laterally-shiftble saw-mill carriage-frame and a drag adapted to frictionally engage a rail on which the carriage travels, and in connection with which the carriage-frame has a certain amount of independent movement and means connected with the saw-mill carriage-frame and drag for causing the automatic lateral shift of the carriage as the frame moves independently of the drag, of means connected with the drag, carriage and axle whereby to prevent the drag from moving on by momentum, independently of the carriage frame, when the latter is suddenly stopped.

3. The combination with a laterally-shiftable saw-mill carriage-frame and a drag adapted to frictionally engage a rail on which the carriage travels, and in connection with which the carriage-frame has a certain amount of independent movement, and means connected with the saw-mill carriage-frame and drag for causing the automatic lateral shift of the carriage as the frame moves independently of the drag, of means connected with the drag for preventing the drag from moving on by momentum, independently of the carriage frame, when the latter is suddenly stopped, said means comprising a friction connected with one of the axles of the carriage and with the drag.

4. The combination with a laterally-shiftable saw-mill carriage-frame and a drag adapted to frictionally engage a rail on which the carriage travels, and in connection with which the carriage-frame has a certain amount of independent movement, and means connected with the saw-mill carriage-frame and drag for causing the automatic lateral shift of the carriage as the frame moves independently of the drag, of means connected with the drag for preventing the drag from moving on by momentum, independently of the carriage frame, when the latter is suddenly stopped, said means comprising a friction band connected with one of the axles of the carriage and with the drag, and means for regulating the tension of said friction means.

5. An offsetting mechanism for saw-mill carriages comprising a drag with which the carriage has limited endwise movement, and means connected with the drag, said means frictionally connected with one of the axles of the carriage, which effectually prevents offsetting of the carriage until the axle reverses.

In testimony whereof I affix my signature.

OLIVER M. KREBS.